United States Patent [19]

Garner et al.

[11] 4,453,163

[45] Jun. 5, 1984

[54] HEADS UP DISPLAY

[75] Inventors: H. Douglas Garner, Newport News; William E. Howell, Yorktown, both of Va.

[73] Assignee: The United States of America as represented by the Administrator of the National Aeronautics and Space Administration, Washington, D.C.

[21] Appl. No.: 383,384

[22] Filed: May 28, 1982

[51] Int. Cl.³ ........................ G01C 21/00; G01C 25/00

[52] U.S. Cl. ................................. 340/980; 73/178 R; 340/971; 340/975; 340/978; 340/705

[58] Field of Search ............... 340/971, 980, 975, 978, 340/705; 73/178 R; 364/434, 440, 424

[56] References Cited

U.S. PATENT DOCUMENTS 3,154,636 10/1964 Schwertz .
3,529,283 9/1970 Emerson ............................ 340/980
3,846,784 11/1974 Sinclair .
3,958,235 5/1976 Duffy .
4,162,493 7/1979 Ross ................................... 340/752

*Primary Examiner*—James J. Groody
*Attorney, Agent, or Firm*—Howard J. Osborn; John R. Manning; William H. King

[57] ABSTRACT

Display for use on propeller driven aircraft comprised of a radially disposed row of lamps 12 embedded in the rear surface of a propeller 11. Measurements of flight data are made by conventional means and converted into digital signals (15 and 18). These digital signals are applied to graphic generators, 16 and 19, which control lamp drivers 13 which in turn control lamps 12 through slip rings 14. The lamps 12 are lit at appropriate times (determined by sync pulses 17) during each revolution of the propeller to cause the flight data in graphic form to appear to the pilot.

6 Claims, 2 Drawing Figures

AIRSPEED TRANSDUCER AND DIGITIZER
15
16
CHARACTER GENERATOR
13
LAMP DRIVERS
12
14
11
12
SYNC PULSE SOURCE
17
19
GRAPHICS GENERATOR
ROLL ANGLE TRANSDUCER AND DIGITIZER
18

HEADS UP DISPLAY

ORIGIN OF THE INVENTION

The invention described herein was made by employees of the United States Government and may be used by or for the Government for governmental purposes without the payment of any royalties thereon or therefor.

BACKGROUND OF THE INVENTION

This invention relates generally to an aircraft display and more particularly concerns a heads-up aircraft display which allows the pilot to view the display without diverting his attention from the scene ahead.

Prior aircraft heads-up displays employ optical projection of the desired image onto a transparent but reflective surface placed in the pilot's field of view. These displays require bulky and heavy projection devices and also require projection surfaces that partially obstruct the pilot's field of vision. In addition, the pilot can view the projection surface from only a limited number of positions.

There are times, such as in instrument landings and crop dusting, that a pilot must have certain critical flight data on display with as little diversion as possible. It is important that the pilot have a clear field of view without obstruction, without having to turn his head and without having to hold his head in a certain position.

It is an object of this invention to provide a heads-up aircraft display without obstructing the pilot's field of view.

Another object of this invention is to provide a heads-up aircraft display which does not require the pilot to turn his head to view the display.

A further object of this invention is to provide a heads-up aircraft display which does not require the pilot to hold his head in certain positions to view the display.

Still another object of this invention is to provide a heads-up aircraft display which does not require bulky and heavy projection devices.

Other objects and advantages of this invention will become apparent hereinafter in the specification and drawings.

SUMMARY OF THE INVENTION

The present invention is suitable for use only on a propeller driven aircraft. A radially disposed row of lamps is set into the rear surface of an aircraft propeller near one of its ends. Measurements, such as airspeed and roll angle, are made by conventional means and converted into digital signals. These digital signals are applied to character and graphic generators which select matrices of binary signals representing the measurements. Sync pulses generated by each revolution of the propeller shaft are applied to the character and graphic generators to apply the binary signals column by column to lamp drivers which control through slip rings the lamps on the propeller. Each time a binary "1" is applied to a lamp driver the corresponding lamp is lit for a short period of time. Consequently, visual representation of the measurements will appear to the pilot.

DETAILED DESCRIPTION OF THE INVENTION

Figure 1:
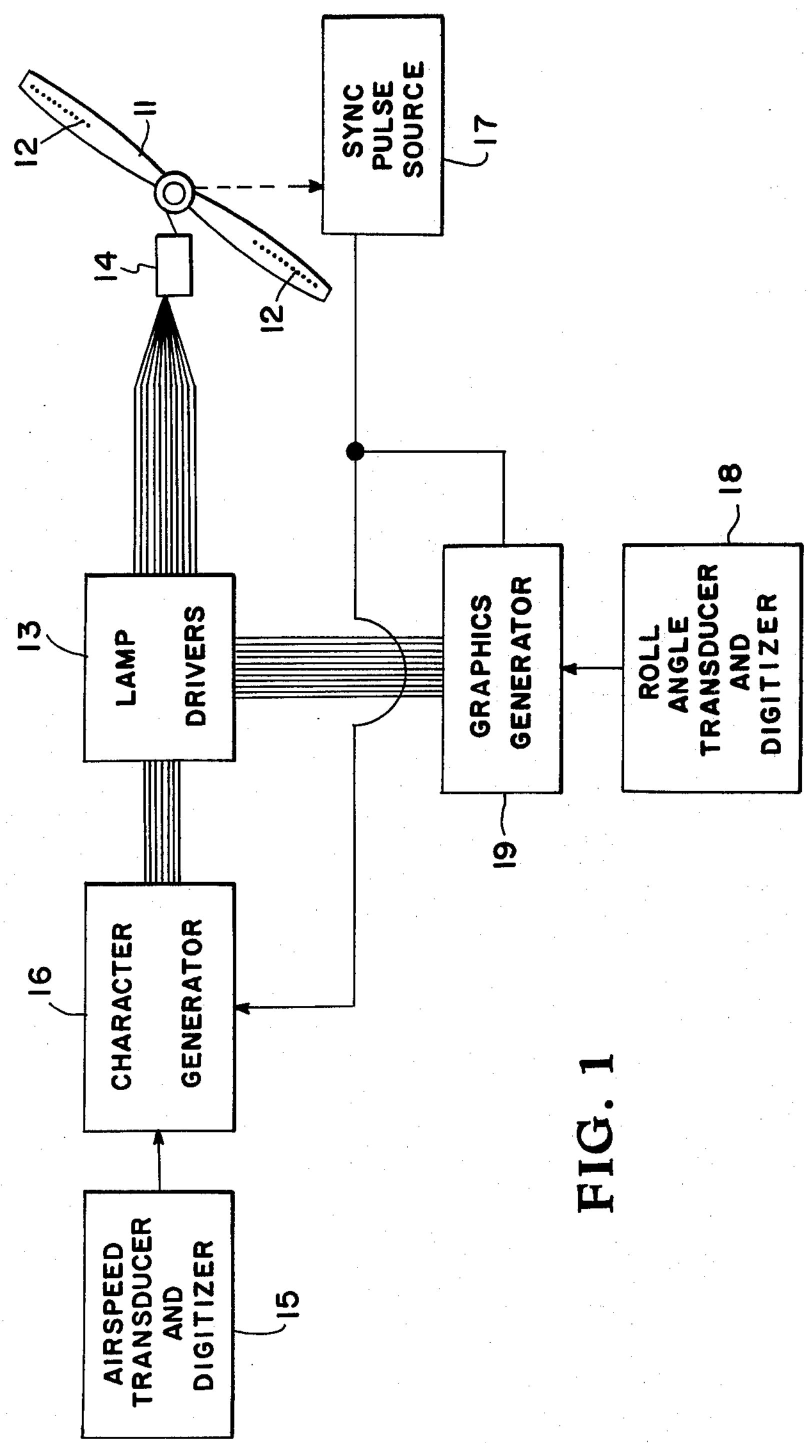
FIG. 1 is a block diagram of the embodiment of the invention selected for illustration.

Turning now to the embodiment of the invention selected for illustration in the drawings, the number 11 in FIG. 1 designates a propeller on a propeller driven aircraft in which the pilot has a clear view of the rear surface of the propeller 11. Embedded in the rear surface of propeller 11 is a row of lamps 12. The row of lamps 12 is in line with the center of rotation of propeller 11 and can be embedded in the rear surface on both ends of the propeller as shown in FIG. 1. For this particular embodiment of the invention, there are eleven lamps in the row and the lamps used are LED (light emitting diodes). Other lamps could be used and any number of lamps sufficient to provide the desired display could be used.

Lamp drivers 13 are connected through slip rings 14 to lamps 12. There is a one-to-one correspondence between lamp drivers 13 and lamps 12. A lamp driver will activate its corresponding lamp for a short period of time whenever an appropriate signal (binary "1") is applied to it. Lamp drivers are gating devices; such as, for example, transistors which, when a signal is applied to one of them, will activate its corresponding lamp by connecting power to it.

An airspeed transducer and digitizer 15 located on the aircraft produces a digital signal that represents the airspeed of the aircraft. This digital signal is applied to a character generator 16 which in response thereto selects a matrix of binary signals from its memory. The selected matrix of binary signals, when displayed to the pilot by the propeller 11 and lamps 12 display system, will be the airspeed in numerical symbols. A binary "1" signal in the selected matrix will activate a lamp 12 when applied to corresponding lamp driver 13, but a binary "0" signal will not activate a lamp 12. The selected matrix has seven rows and as many columns as are necessary to provide the numerical information.

Pulses from a sync pulse source 17 are applied to character generator 16 to sequentially apply column by column the binary signals in the selected matrix to lamp drivers 13. The pulses in sync pulse source 17 are generated at each point in the revolution of propeller 11 that a column of binary signals from the selected matrix is to be displayed by lamps 12. All the pulses from source 17 can be generated mechanically by propeller 11 or alternatively one pulse per revolution of propeller 11 can be generated mechanically and used to generate the pulses by conventional electronic means. The electronic means can be a variable frequency oscillator whose frequency is controlled by the rotational speed of propeller 11.

Information that is preferred to be displayed in graphics, other than numerical symbols, can also be displayed by this invention. For example, a roll angle transducer and digitizer 18 located on the aircraft produces a digital signal indicative of the roll angle of the aircraft. This digital signal is applied to a graphics generator 19 which in response thereto selects a matrix of binary signals which, when displayed by lamps 12 and propeller 11, will be the measured roll angle in graphic form. Graphics generator 19 is similar to character generator 16 except that the graphics generator 19 has graphic displays stored in its memory and the stored matrices of binary signals have eleven rows instead of seven to adequately accommodate the graphic display. Consequently, all eleven of the lamps 12 are used to display the graphics, whereas only seven are used to display the numerical symbols. The term graphics generator as used in this specification and the claims is intended to be broader than and include character generator.

Transducers and digitizers, 15 and 18, and character or graphics generators, 16 and 19, are well known and commercially available and hence are not disclosed in this application. It should be noted that ordinarily when generators, such at 16 and 19, are used the display area is rectangular corresponding to the shape of the matrices selected by the generators. However, in the present invention the display area is in the shape of a sector of a circle requiring the binary information on the selected matrices be slightly altered to correct for slight errors caused by transformations from selected matrices to the display.

Figure 2:
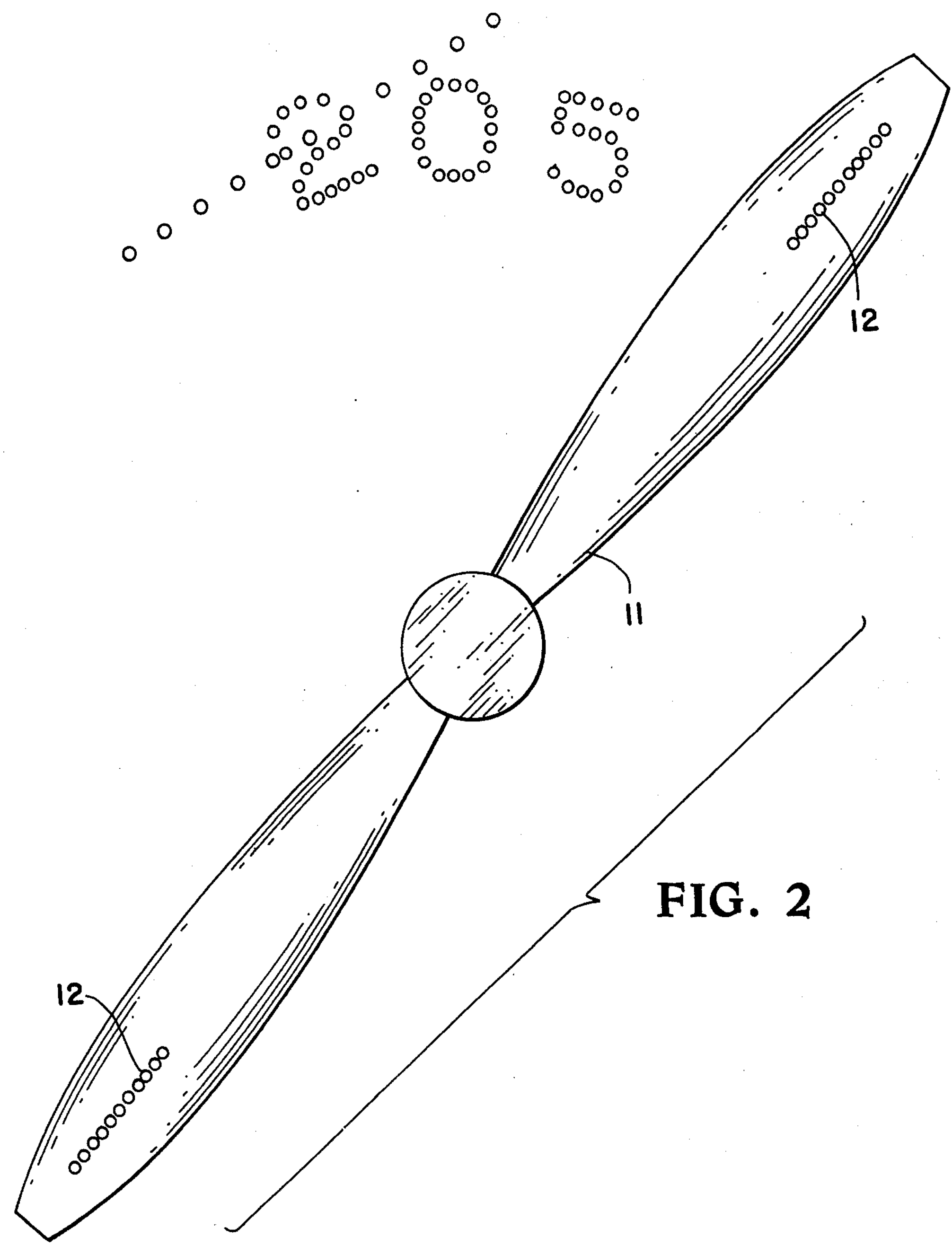
FIG. 2 is a schematic drawing of a display provided by the invention.

In the operation of this invention, assuming the measured airspeed is 205 mph and the roll angle is 30° to the left, the pilot will see the display as shown in FIG. 2. The small circles indicate the lamps that are activated and appear to the pilot.

As shown in FIG. 1, a row of lamps 12 is located on each end of propeller 11. The invention is operable with a row of lamps at only one end as long as the propeller 11 is rotating at a rate of at least 960 revolutions per minute.

The advantages of this invention are that bulky and heavy projection devices are not required, that projection surfaces are not required and thus, do not partially obstruct the pilot field of view, and that the pilot is not limited to holding his head in certain positions to view the display.

What is claimed is:

1. A display for a propeller driven aircraft in which the rear surface of a propeller is in view of the pilot of the aircraft comprising:

a row of lamps on the rear surface of said propeller that is in view of the pilot;

a plurality of lamp drivers in one-to-one correspondence with said lamps and with each lamp driver connected to control its corresponding lamp;

means on said aircraft for producing signals indicative of the criteria to be displayed;

means for producing a plurality of sync pulses during each revolution of said propeller while said aircraft is in flight, with each sync pulse produced at a different time; and graphics generating means connected to receive said signals indicative of the criteria to be displayed and said sync pulses for activating through said lamp drivers selected ones of said lamps each time a sync pulse is received to provide a visual display of the criteria to the pilot.

2. A display as in claim 1 wherein said row of lamps is in line with the center of rotation of said propeller.

3. A display as in claim 2 wherein said row of lamps is a row of lamps at each end of said propeller.

4. A display as in claim 1 wherein said graphics generating means includes a character generator responsive to a first signal indicative of criteria that can be represented by a number and a graphic generator responsive to a second signal indicative of criteria that can be represented by a symbol other than a number.

5. A display as in claim 4 wherein some of said lamps are controlled by both said character generator and said graphics generator control.

6. A display as in claim 1 wherein said lamp drivers are connected to said lamps through slip rings.

* * * * *